(12) United States Patent
Seo et al.

(10) Patent No.: US 12,304,394 B2
(45) Date of Patent: May 20, 2025

(54) VIRTUAL IMAGE DISPLAY DEVICE

(71) Applicant: HONDA MOTOR CO., LTD., Tokyo (JP)

(72) Inventors: Toshiaki Seo, Saitama (JP); Minoru Higuchi, Saitama (JP); Shinichi Murakami, Saitama (JP); Koji Dan, Saitama (JP); Ryo Iitaka, Saitama (JP); Takaya Yamazaki, Saitama (JP); Aya Sasaki, Saitama (JP)

(73) Assignee: HONDA MOTOR CO., LTD, Tokyo (JP)

( * ) Notice: Subject to any disclaimer, the term of this patent is extended or adjusted under 35 U.S.C. 154(b) by 210 days.

(21) Appl. No.: 18/349,970

(22) Filed: Jul. 11, 2023

(65) Prior Publication Data
US 2024/0017673 A1  Jan. 18, 2024

(30) Foreign Application Priority Data

Jul. 15, 2022  (JP) .................................. 2022-114034

(51) Int. Cl.
*B60R 1/28* (2022.01)
*G06F 3/01* (2006.01)
*G06V 20/58* (2022.01)
*G09G 5/00* (2006.01)

(52) U.S. Cl.
CPC ................ *B60R 1/28* (2022.01); *G06F 3/013* (2013.01); *G06V 20/58* (2022.01); *G09G 5/003* (2013.01); *B60R 2300/605* (2013.01); *B60R 2300/802* (2013.01); *G09G 2340/045* (2013.01); *G09G 2340/0457* (2013.01); *G09G 2380/10* (2013.01)

(58) Field of Classification Search
CPC .................................. G06F 3/013; B60R 1/28
See application file for complete search history.

(56) References Cited

U.S. PATENT DOCUMENTS

2019/0347490 A1* 11/2019 Iida ........................... B60R 1/28
2020/0064640 A1*  2/2020 Nagano .................... H04N 5/74
2021/0104212 A1*  4/2021 Horihata ................. B60R 16/02

FOREIGN PATENT DOCUMENTS

JP            2009226978 A     10/2009

* cited by examiner

*Primary Examiner* — Shivang I Patel
(74) *Attorney, Agent, or Firm* — CKC & PARTNERS CO., LLC (57) ABSTRACT

The virtual image display device comprises a surrounding state recognizer that acquires a travel direction distance and a lateral direction distance to an object, and a display controller that displays object icon images I1, I2 in a screen 51. The display controller is capable of switching between displaying an image in a normal mode, in which the display positions of the images I1, I2 move closer in a lateral direction to a lateral reference line L1 as the travel direction distance increases, and move farther away in a screen vertical direction from a screen bottom line L2 as the travel direction distance increases, and displaying the image in a magnification mode, in which a vertical scale, which is the ratio of the distance between the line L2 and the display positions in the screen vertical direction to the orientation direction distance, is larger than in the normal display mode.

14 Claims, 6 Drawing Sheets

VIRTUAL IMAGE DISPLAY DEVICE

This application is based on and claims the benefit of priority from Japanese Patent Application No. 2022-114034, filed on 15 Jul. 2022, the content of which is incorporated herein by reference.

BACKGROUND OF THE INVENTION

Field of the Invention

The present invention relates to a virtual image display device. More specifically, the present invention relates to a virtual image display device that displays an object image relating to an object that is present in an orientation direction from a point of view based on a user, who is a person, or a mobile body that moves together with the user, the virtual image display device displaying the object image on a display screen visible to the user in a manner such that a sense of depth is provided.

Related Art

In recent years, in order to improve traffic safety, virtual image display devices have been proposed, such virtual image display devices displaying virtual images that are helpful in supporting safe driving on a monitor visible to the driver while driving. For example, the device disclosed in Japanese Unexamined Patent Application, Publication No. 2009-226978 causes a monitor to display a virtual image relating to a blind spot in the right-left direction in front of a vehicle. Thus, when there is a blind spot in front of the vehicle, the driver can perceive the presence of vehicles that may appear in front of the user's vehicle from the blind spot by checking the monitor, which can improve traffic safety.
Patent Document 1: Japanese Unexamined Patent Application, Publication No. 2009-226978

SUMMARY OF THE INVENTION

In typical virtual image display devices, the monitor often displays virtual images in a manner that provides a sense of depth to the viewer, in order to enable the driver (user) to quickly compare the scenery he or she can see directly with his or her own eyes with the virtual image displayed on the monitor.

However, in virtual images that are drawn based on the laws of perspective, the size of an object image decreases as the distance in the depth direction from the user's vehicle (i.e., the travel direction) increases. In addition, the display position of the object image asymptotically approaches the vanishing point as the distance in the depth direction from the user's vehicle increases. There is therefore a problem with virtual images that are drawn based on the laws of perspective, in that, for example, when a plurality of objects are present far from the user's vehicle, the distance between these far-off objects (particularly, the distance in the depth direction) is difficult for the driver to perceive.

The purpose of the present invention is to provide a virtual image display device capable of displaying an image in which a sense of distance of objects that are present far away can easily be ascertained.

(1) A virtual image display device (for example, the virtual image display device 1 described below) according to the present invention recognizes a traffic participant as an object, the traffic participant being present in an orientation direction from a point of view (for example, the point of view 95 described below) determined based on a user, who is a person, or a mobile body that moves together with the user, and displays an object image (for example, the object icon images I1 and I2 described below) associated with the object on a display screen (for example, the display screen 51 described below) that is visible to the user, in a manner such that a sense of depth is provided, the virtual image display device including: a surrounding state recognizer (for example, the surrounding state recognizer 6 described below) that acquires surrounding state information relating to a state of the surroundings of the point of view, and acquires, on the basis of the surrounding state information, object position information including information about a distance from the point of view to the object in the orientation direction and a distance from the point of view to the object in a lateral direction that is orthogonal to the orientation direction; and a display controller (for example, the display controller 8 described below) configured to display the object image at a display position in the display screen, the display position being determined on the basis of the object position information. The display controller is capable of switching between displaying an image in a normal display mode, in which the display position moves farther away in the lateral direction from a lateral reference (for example, the lateral reference line L1 described below) in the display screen as the lateral direction distance increases, moves closer in the lateral direction to the lateral reference as the orientation direction distance increases, and moves farther away in a vertical direction from a bottom (for example, the screen bottom line L2 described below) of the display screen as the orientation direction distance increases, and displaying the image in a magnification display mode, in which a vertical scale, which is the ratio of the distance between the screen bottom and the display position in the vertical direction to the orientation direction distance, is larger than in the normal display mode.

(2) In this case, it is preferable that the vertical scale for a short-distance object at an orientation direction distance that is equal to or less than a distance threshold value be equal in the normal display mode and in the magnification display mode.

(3) In this case, it is preferable that the display controller switch between displaying the image in the normal display mode and displaying the image in the magnification display mode, on the basis of the surrounding state information.

(4) In this case, it is preferable that on the basis of the surrounding state information, the display controller display the image in the magnification display mode when a predetermined number of objects or more are recognized within a predetermined duration of time, when the presence of a region in which the density of objects is equal to or more than a predetermined value is recognized, when the presence of a specific facility or a specific equipment is recognized in the orientation direction from the point of view, or when the presence of a road having a specific form is recognized in the orientation direction from the point of view.

(5) In this case, it is preferable that the virtual image display device further comprise a line-of-sight direction acquirer that acquires a line-of-sight direction, which is the orientation of the line of sight or the face of the user, who is the driver of the mobile body, wherein the display controller displays the image in the magnification display mode when an object is present in the line-of-sight direction.
(6) In this case, it is preferable that the display controller display the image in the magnification display mode when a first object and a second object are recognized in the orientation direction from the point of view, and a gap in the orientation direction between the first object and the second object is equal to or smaller than a gap threshold value.
(7) In this case, it is preferable that when displaying a plurality of the object images on the display screen in the magnification display mode, the display controller display object-related information associated with each object in the vicinity of each object image.
(8) In this case, it is preferable that the object-related information include at least one of position information, movement direction information, movement speed information, or type information of the object.
(1) In the present invention, the surrounding state recognizer recognizes a traffic participant that is present in the orientation direction from the point of view as an object, and acquires object position information including information about the distance from the point of view to the object in the orientation direction and the distance from the point of view to the object. The display controller displays an image on the display screen in a manner that provides the viewer with a sense of depth, by displaying an object icon at a display position in the display screen determined on the basis of the object position information. In addition, the display controller is capable of switching between displaying the image in a normal display mode (that is, displaying the image based on the laws of perspective), in which the display position moves farther away in the lateral direction from the lateral reference in the display screen as the lateral direction distance increases, moves closer in the lateral direction to the lateral reference as the orientation direction distance increases, and moves farther away in a vertical direction from a bottom of the display screen as the orientation direction distance increases, and displaying the image in a magnification display mode, in which the vertical scale, which is the ratio of the distance on the display screen between the screen bottom line and the display position in the vertical direction to the orientation direction distance, is larger than in the normal display mode. In the magnification display mode, the vertical scale is set to be larger than in the normal display mode, such that when, for example, two objects are present far away, the object images of these two objects are displayed more separate in the vertical direction in the display screen than in the normal display mode. Thus, according to the present invention, the sense of distance between objects that are present far away can easily be ascertained by a user, by displaying the image in the magnification display mode described above.
(2) By making the vertical scale larger as described above, it is easy for the user to ascertain the sense of distance of objects that are present far away, but it is difficult to ascertain the sense of distance of objects that are present at positions near the point of view. To address this, in the present invention, the vertical scale for short-distance objects at an orientation direction distance that is equal to or less than the distance threshold value is set to be equal in the normal display mode and in the magnification display mode, whereby the user can easily ascertain the sense of distance of both objects that are present far away from the point of view and objects that are present near the point of view.
(3) In the present invention, the display controller switches between displaying the image in the normal display mode and displaying the image in the magnification display mode on the basis of surrounding state information regarding the state of the surroundings of the point of view. Thus, according to the present invention, it is possible to switch between the normal display mode and the magnification display mode at an appropriate timing in response to a change in the state of the surroundings of the point of view.
(4) In the present invention, on the basis of the surrounding state information, the display controller displays the image in the magnification display mode when a predetermined number of objects or more are recognized within a predetermined duration of time, when the presence of a region in which the density of objects is equal to or more than a predetermined value is recognized, when the presence of a specific facility or specific equipment is recognized in the orientation direction from the point of view, or when the presence of a road having a specific form is recognized in the orientation direction from the point of view. Thus, according to the present invention, by displaying the image in the magnification display mode when many objects are already present in the orientation direction, or when many objects are expected to appear in the orientation direction, it is easy for the user to ascertain the distance between the plurality of such objects.
(5) In the present invention, the line-of-sight direction acquirer acquires a line-of-sight direction, which is the orientation of the line of sight or the face of the user, who is the driver of the mobile body, and the display controller displays the image in the magnification display mode when an object is present in the line-of-sight direction, that is to say, when the user is looking at an object. This makes it easy for the user to ascertain the sense of distance of an object he or she is looking at.
(6) In the present invention, the display controller displays the image in the magnification display mode when a first object and a second object are recognized in the orientation direction from the point of view, and a gap in the orientation direction between the first object and the second object is equal to or smaller than a gap threshold value. Thus, when two object images would overlap in the normal display mode, displaying the image in the magnification display mode ensures that the two object images will not overlap.
(7) In the present invention, when displaying a plurality of object images on the display screen in the magnification display mode, the display controller may display many items of information on the display screen without giving the viewer a sense of clutter, by displaying object-related information associated with each object in the vicinity of each object image.
(8) In the present invention, the object-related information includes at least one of position information, movement direction information, movement speed information, or type information of the object. Thus, according to the present invention, it is possible to quickly recognize information that would be difficult to ascertain from only the object image, such as the position, the movement direction, the movement speed, and the type of the object.

DETAILED DESCRIPTION OF THE INVENTION

A virtual image display device according to an embodiment of the present invention is described below with reference to the drawings.

Figure 1:
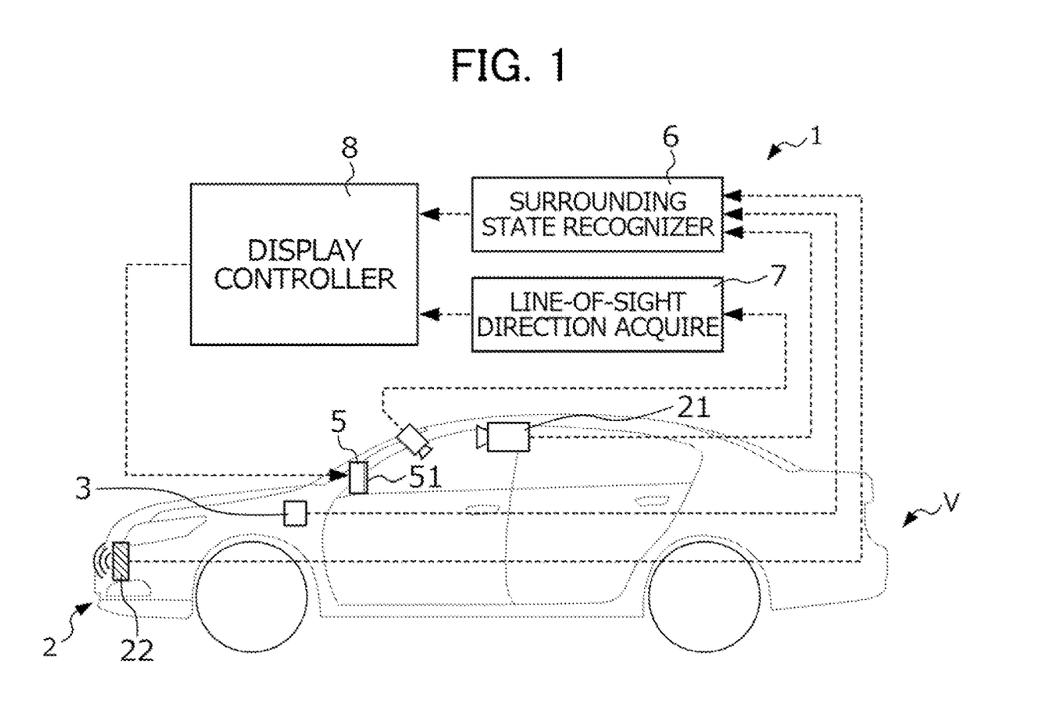
FIG. 1 schematically illustrates a virtual image display device according to an embodiment of the present invention, and an automobile in which the virtual image display device is installed.

FIG. 1 schematically illustrates a virtual image display device 1 according to the present embodiment, and a vehicle V in which the virtual image display device 1 is installed.

The virtual image display device 1 recognizes traffic participants (pedestrians, mobile bodies, and the like) as objects, the traffic participants being present in an orientation direction from a point of view based on a user, who is a person, or a mobile body that moves together with the user (when the point of view is determined based on the user, the orientation direction is the orientation of the user's line of sight or face, and when the point of view is determined based on the mobile body, the orientation direction is the travel direction of the mobile body), and displays object images associated with such objects on a display screen 51 of a display 5 that is provided at a position visible to the user, in a manner such that a sense of depth is provided, thereby supporting perception of objects by the user. Described below is a case in which the user is a driver of an automobile, and the virtual image display device 1 is installed in a vehicle V, which is a four-wheeled automobile, but the invention is not so limited. In the present invention, the user may be the driver of a mobile body other than a four-wheeled automobile, such as a truck, a saddled vehicle, a bicycle, or the like, and the virtual image display device may be installed in such mobile bodies. Particularly when installed in a saddled vehicle among such mobile bodies, the virtual image display device may be installed in a helmet worn by the rider, who is the user. Alternatively, the user may be a pedestrian, and the virtual image display device may be installed in a wearable device (for example, spectacles, a wristwatch, or the like) worn by the pedestrian.

The vehicle V includes an external sensor unit 2 that acquires information about what is forward in the travel direction, a navigation device 3, an interior camera unit 4, and the virtual image display device 1 that displays a virtual image for supporting safe driving by the driver on a display screen 51.

The external sensor unit 2 is composed of a front camera unit 21, a front radar unit 22, and the like.

The front camera unit 21 includes a digital camera using a solid image capturing element such as, for example, a charge coupled device (CCD) or a complementary metal oxide semiconductor (CMOS). This front camera unit 21 is mounted, for example, at a position toward the windshield on the vehicle interior side of the roof of the vehicle V, in a state of being oriented forward in the travel direction. The front radar unit 22 includes a millimeter-wave radar that detects objects by measuring reflected waves from objects irradiated by a millimeter wave. The front radar unit 22 is mounted, for example, to the front bumper of the vehicle V, in a state of being oriented forward in the travel direction.

The navigation device 3 includes, for example, a global navigation satellite system (GNSS) receiver that identifies the position of the user's vehicle on the basis of a signal received from a GNSS satellite, a storage device storing map information, and the like. The map information includes information relating to road signs. The navigation device 3 transmits information relating to the current position of the user's vehicle, along with map information about the current position, to the virtual image display device 1.

The interior camera unit 4 includes a digital camera using a solid image capturing element such as, for example, the ones described above. This interior camera unit 4 is provided in the vehicle interior, in a state of being oriented toward the face of the driver sitting in the driver seat. Images of the driver captured by the interior camera unit 4 are transmitted to the virtual image display device 1.

The virtual image display device 1 includes: a display 5 that is provided at a position visible to the driver while driving; a surrounding state recognizer 6 that acquires surrounding state information relating to the state of the surroundings of the vehicle V, acquired by the external sensor unit 2 and the navigation device 3, and recognizes the state of the surroundings of the vehicle V; a line of sight direction acquirer 7 that acquires a line of sight direction, which is the orientation of the line of sight or the face of the driver, on the basis of the image transmitted from the interior camera unit 4; and a display controller 8 that displays, on the display screen 51 of the display 5, a virtual image regarding what is forward in the travel direction of the vehicle V, the virtual image being generated on the basis of the recognized result of the surrounding state recognizer 6.

In the present embodiment, a case is described in which the display controller 8 displays the virtual image on the display screen 51 of the display 5 provided in front of the driver seat, but the present invention is not so limited. By using a heads-up display, the display controller 8 may display the virtual image using part of the windshield as the display screen.

On the basis of the surrounding state information acquired from the external sensor unit 2 and the navigation device 3, the surrounding state recognizer 6 recognizes one or more traffic participants that are present forward in the travel direction from a point of view determined based on the vehicle V as objects, and acquires object position information and object-related information about each object. The object position information includes information regarding a travel direction distance from the point of view to the object in the travel direction, and information regarding a lateral direction distance from the point of view to the object in a lateral direction that is orthogonal to the travel direction. The object-related information includes at least one of position information, movement direction information, movement speed information, or type information of the object.

The point of view determined for the vehicle V is determined at any position, for example, in the interior of the vehicle V (more specifically, the driver seat) or the exterior of the vehicle V (more specifically, a position separated by a predetermined distance rearward in the travel direction from the rear end portion of the vehicle V). When the driver seat is determined as the point of view, a virtual image having the same point of view as the driver can be displayed. When a position separated rearwardly from the rear end portion of the vehicle V is determined as the point of view, a virtual image having a bird's-eye view that includes the user's vehicle in the field of view can be displayed.

The surrounding state recognizer 6 acquires the object information and the object-related information as described above, and, on the basis of the surrounding state information acquired from the external sensor unit 2 and the navigation device 3, acquires traffic environment information about traffic participants including the vehicle V and recognized objects. The traffic environment information includes information regarding the number of lanes of the road on which the vehicle is traveling, the presence or absence of a sidewalk, the types of facilities or equipment present forward in the travel direction, the shape of the road present forward in the travel direction, and the like.

In the present embodiment, a case is described in which the surrounding state recognizer 6 acquires the surrounding state information from the external sensor unit 2 and the navigation device 3 as vehicle-mounted devices that move along with the vehicle V, but the present invention is not so limited. The surrounding state recognizer 6 may acquire the surrounding state information through inter-vehicle communication between the user's vehicle and other vehicles traveling nearby, or through communication between the user's vehicle and a server device that monitors the traffic state of the road on which the user's vehicle is traveling.

The display controller 8 generates a virtual image replicating the scenery that can be seen forward in the travel direction from the point of view, on the basis of the recognition result from the surrounding state recognizer 6, and displays this virtual image on the display screen 51 of the display 5. More specifically, the display controller 8 generates a virtual image in a manner that provides the viewer with a sense of depth, by drawing object images associated with the objects recognized by the surrounding state recognizer 6 at predetermined positions and at predetermined sizes superimposed on a background image that corresponds to the traffic environment recognized by the surrounding state recognizer 6.

The display controller 8 is capable of generating a virtual image in a normal display mode or in a magnification display mode, and displaying this virtual image. The process of generating a virtual image in each display mode is described below, using a situation such as that illustrated in FIG. 2 as an example.

Figure 2:
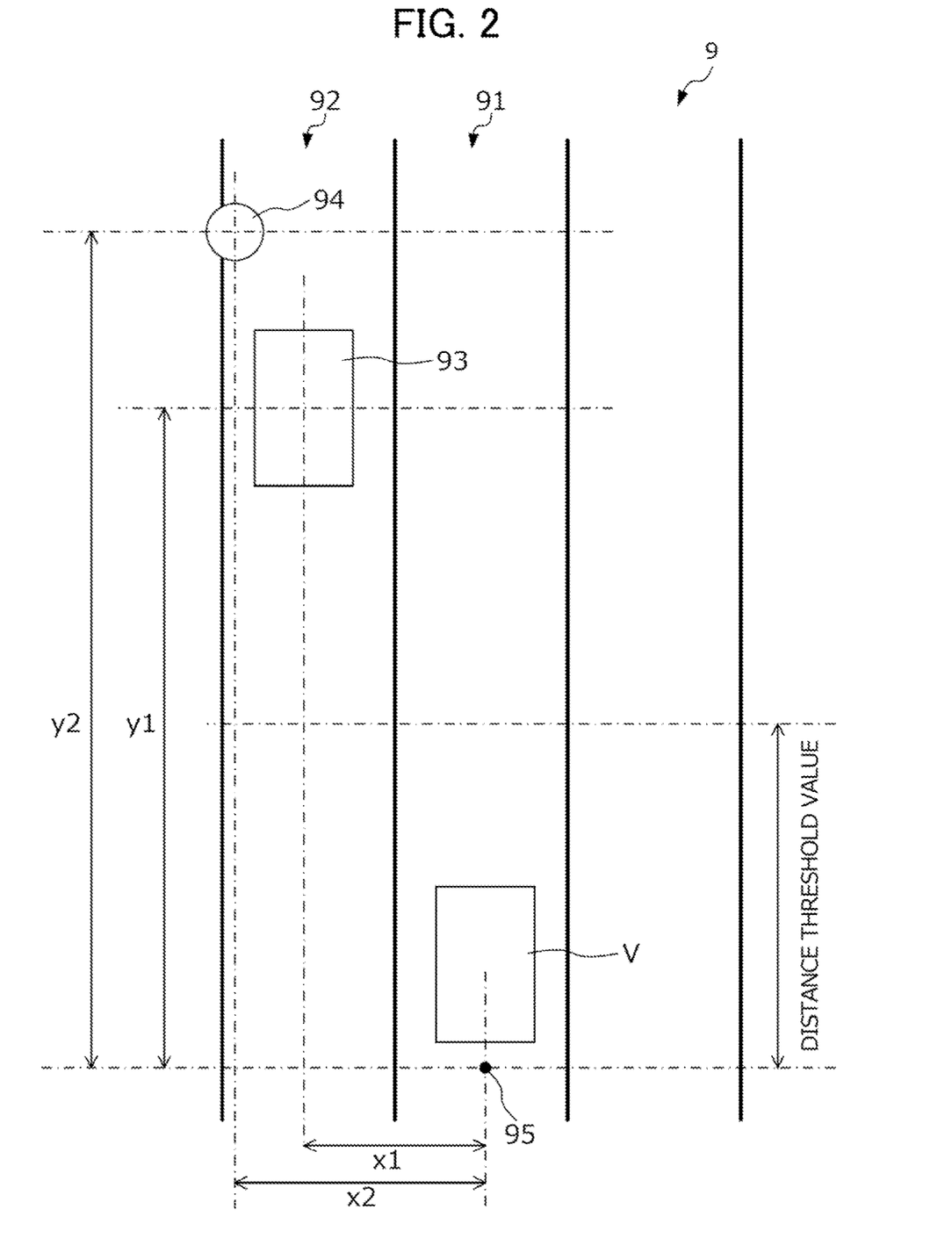
FIG. 2 is a plan view seen from above of a vehicle traveling on a road that has three lanes in one direction.

FIG. 2 is a plan view seen from above of a vehicle V traveling on a road 9 that has three lanes in one direction. FIG. 2 illustrates a case in which the vehicle V, which is the user's vehicle, is traveling on the center lane 91, and another vehicle 93 and a pedestrian 94 are present forward in the traveling direction thereof. In addition, FIG. 2 illustrates a case in which the other vehicle 93 is stopped on the lane 92 on the side of the sidewalk, and the pedestrian 94 is about to enter the lane 92 from the sidewalk, through the forward part of the travel direction of the other vehicle 93. Below, a case is described in which the point of view 95 is set rearward in the travel direction of the vehicle V, and the surrounding state recognizer 6 recognizes the other vehicle 93 as a first object and the pedestrian 94 as a second object.

<Normal Display Mode>

Figure 3:
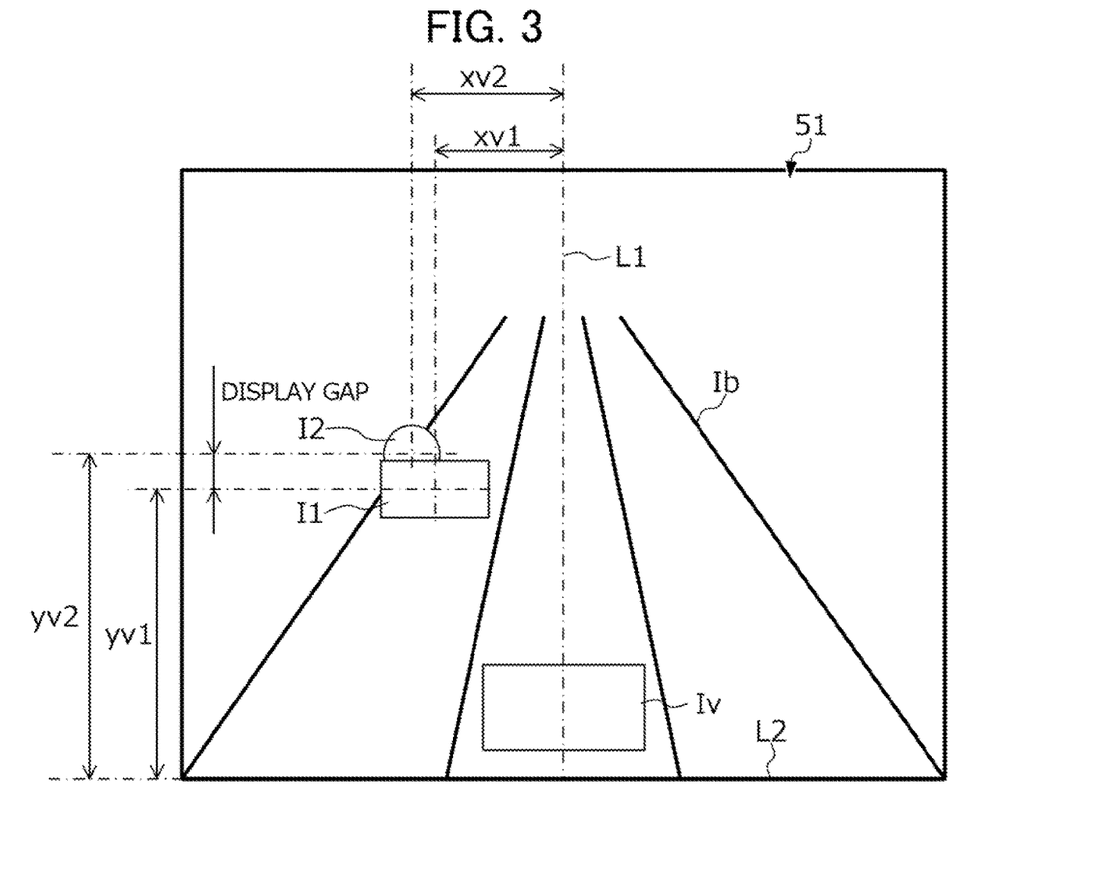
FIG. 3 illustrates an example of a virtual image that is displayed on a display screen when a display controller has displayed the image in a normal display mode under the conditions illustrated in FIG. 2.

FIG. 3 illustrates an example of a virtual image that is displayed on the rectangular display screen 51 when the display controller 8 has displayed the image in the normal display mode under the conditions illustrated in FIG. 2. As illustrated in FIG. 3, the virtual image is composed of, for example, a background image Ib mimicking the lane markers of the road on which the vehicle is traveling, a user's vehicle icon image Iv associated with the vehicle V, and object icon images I1 and I2 associated with the objects 93 and 94. In the below description, the user's vehicle icon image Iv and the object icon image I1 associated with an object that is a vehicle are simplified as rectangular shapes, and the object icon image I2 associated with an object that is a pedestrian is simplified as a circular shape.

When displaying the image in the normal display mode, the display controller 8 displays the user's vehicle icon image Iv and the object icon images I1 and I2 on the background image Ib generated according to the traffic environment recognized by the surrounding state recognizer 6, at positions and sizes that provide the viewer with a sense of depth. Described below is a case in which only the lane markers of the road are displayed as the background image, but the present invention is not so limited. Other than the lane markers of the road, facilities, equipment, and the like that are present on the road may be displayed as the background image, or a square-block type grid may be displayed as the background image.

When displaying the image in the normal display mode, the display controller 8 reduces the sizes of the icon images Iv, I1, and I2 on the display screen 51 as the travel direction distance, which is the distance from the point of view to an object in the travel direction, increases.

When displaying the image in the normal display mode, the display controller 8 changes the display positions of the icon images Iv, I1, and I2 on the display screen 51, such that the display positions move farther away in a screen lateral direction from a lateral reference line L1 virtually defined in the display screen 51 as the lateral direction distance from the point of view to the object increases, and such that the display positions move closer in the screen lateral direction to the lateral reference line L1 as the travel direction distance increases. In addition, the display controller 8 displays objects present on the right-hand side as seen from the point of view in the travel direction on the right-hand side of the lateral reference line L1 in the display screen 51, and displays objects present on the left-hand side as seen from the point of view in the travel direction on the left-hand side of the lateral reference line L1 in the display screen 51. Described below is a case in which the lateral reference line L1 that extends in the screen vertical direction is set in the center of the display screen 51, but the present invention is not so limited.

In addition, when displaying the image in the normal display mode, the display controller 8 changes the display positions of the icon images Iv, I1, and I2 on the display screen 51, such that the display positions move farther away from a screen bottom line L2 of the display screen 51 in a screen vertical direction that is orthogonal to the screen lateral direction as the travel direction distance from the point of view to an object increases.

In the below description, the ratio of the distance in the screen lateral direction between the lateral reference line L1 and the display position on the display screen 51 to the actual lateral direction distance is referred to as the horizontal scale. In other words, in the example illustrated in FIG. 2 and FIG. 3, the horizontal scale for the first object 93 is xv1/x1, and the horizontal scale for the second object 94 is xv2/x2. Accordingly, when displaying the image in the normal display mode, the display controller 8 asymptotically brings the horizontal scale closer to 0 as the travel direction distance increases.

In addition, in the below description, the ratio of the distance in the screen vertical direction between the screen bottom line L2 and the display position on the display screen 51 to the actual travel direction distance is referred to as the vertical scale. In other words, in the example illustrated in FIG. 2 and FIG. 3, the vertical scale for the first object 93 is yv1/y1, and the vertical scale for the second object 94 is yv2/y2. Accordingly, when displaying the image in the normal display mode, the display controller 8 asymptotically brings the vertical scale closer to 0 as the travel direction distance increases.

When displaying the image in the normal display mode, the display controller 8 is capable of displaying a virtual image so as to provide the viewer with a sense of depth, by setting the display positions and the sizes of the icon images Iv, I1, and I2 on the display screen 51 according to the process described above. However, in the virtual image displayed on the display screen 51 in the normal display mode, the object icon images I1 and I2 associated with the two objects 93 and 94 present far away from the point of view in the travel direction often overlap each other, as illustrated in FIG. 3. Therefore, it is difficult for the driver to ascertain a sense of distance between the objects 93 and 94 that are present far away from the point of view.

<Magnification Display Mode>

Figure 4:
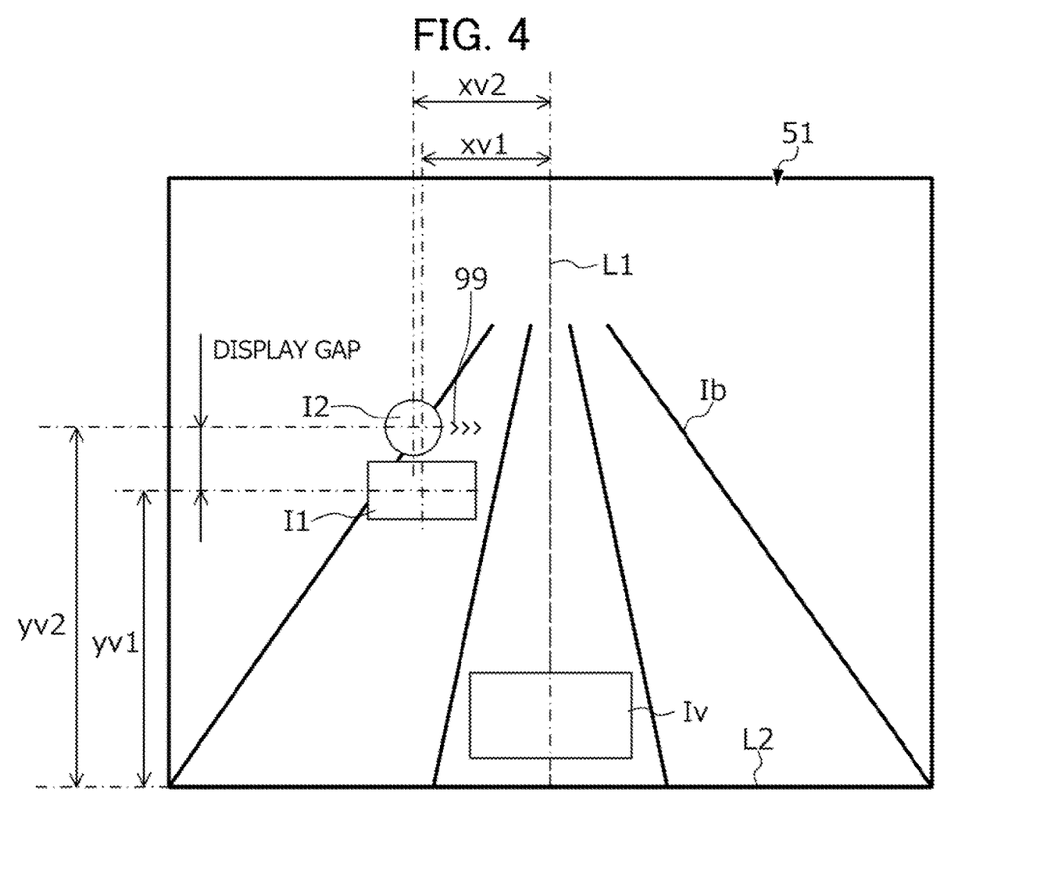
FIG. 4 illustrates an example of a virtual image that is displayed on the display screen when the display controller has displayed the image in a magnification display mode under the conditions illustrated in FIG. 2.

FIG. 4 illustrates an example of a virtual image that is displayed on the display screen 51 when the display controller 8 has displayed the image in a magnification display mode under the conditions illustrated in FIG. 2.

As illustrated in FIG. 4, when displaying an image in the magnification display mode, the display controller 8 displays the user's vehicle icon image Iv and the object icon images I1 and I2 on the background image Ib generated according to the traffic environment recognized by the surrounding state recognizer 6, at positions and sizes that provide the viewer with a sense of depth.

When displaying the image in the magnification display mode, the display controller 8 changes at least the display positions of the object icon images I1 and I2 on the display screen 51 compared to the normal display mode, in order to make it easier for the viewer to ascertain a sense of distance between objects that are present far from the point of view. More specifically, when displaying the image in the magnification display mode, the display controller 8 increases the vertical scale compared to the normal display mode.

As is apparent from a comparison of FIG. 3 and FIG. 4, this makes a display gap in the screen vertical direction between the two object icon images I1 and I2 on the display screen 51 larger when the image is displayed in the magnification display mode than when the image is displayed in the normal display mode. Therefore, overlapping of the two object icon images I1 and I2 in the virtual image generated in the normal display mode (see FIG. 3) may be resolved when the image is displayed in the magnification display mode as illustrated in FIG. 4. It is thus easier for the driver to ascertain a sense of distance between the objects 93 and 94 that are present far from the point of view.

As described above, the display controller 8 is capable of making it easier to ascertain a sense of distance between objects that are present far from the point of view by increasing the vertical scale in the magnification display mode compared to the normal display mode, but in this case, there is a risk that it may become more difficult to ascertain a sense of distance to short-distance objects that are present at positions near the point of view. Accordingly, it is preferable that the display controller 8 sets the vertical scale for short-distance objects at a travel direction distance that is equal to or less than a distance threshold value (see FIG. 2) to be equal in the normal display mode and in the magnification display mode, and sets the vertical scale for long-distance objects at a travel direction distance that is equal to or more than the distance threshold value to be greater in the magnification display mode than in the normal display mode. This distance threshold value may be a fixed value, or may change according to the user's vehicle speed. In other words, the distance threshold value may be greater as the vehicle speed increases.

Figure 5:
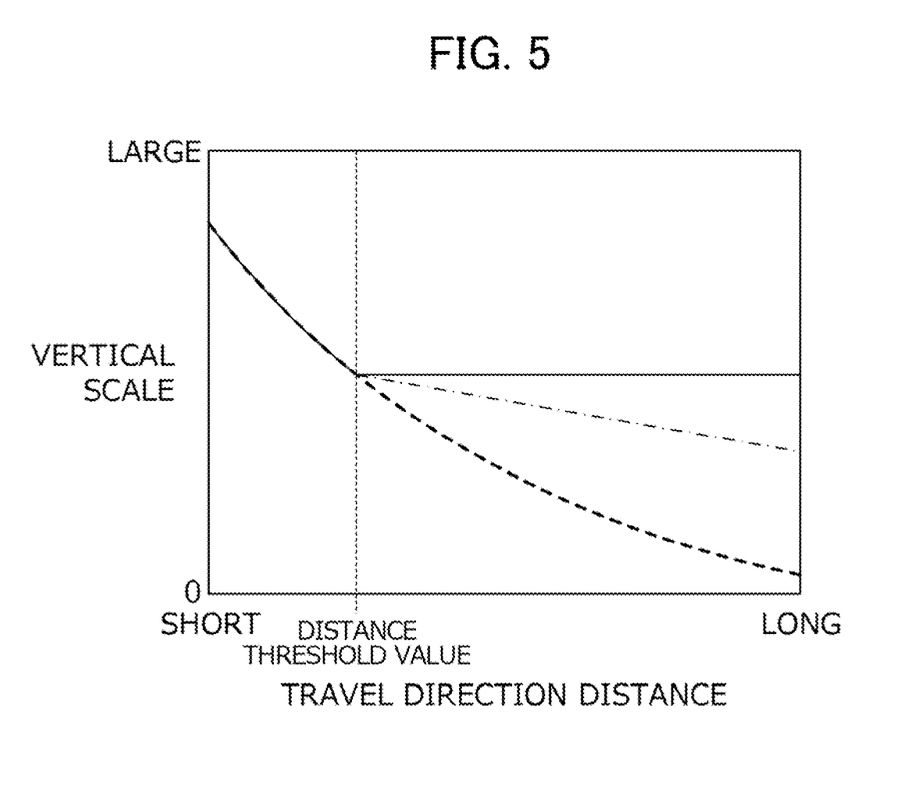
FIG. 5 illustrates a comparison of the vertical scale between the normal display mode and the magnification display mode.

FIG. 5 illustrates a comparison of the vertical scale between the normal display mode (the dashed line) and the magnification display mode (the solid line and the dash-dot line). As indicated by the dashed line in FIG. 5, when displaying the image in the normal display mode, the display controller 8 asymptotically brings the vertical scale closer to 0 as the travel direction distance increases. This means that display positions of object icon images set in the normal display mode converge on a horizon that is virtually defined in the display screen 51 as the travel direction distance increases.

By contrast, as indicated by the solid line and the dash-dot line in FIG. 5, when displaying the image in the magnification display mode, the display controller 8 sets the vertical scale for short-distance objects at a travel direction distance that is equal to or less than the distance threshold value to be equal to that of the normal display mode, and sets the vertical scale for long-distance objects at a travel direction distance that is equal to or more than the distance threshold value to be greater than that of the normal display mode. At this time, the display controller 8 may set the vertical scale for a long-distance object to be a constant value that is the same as the vertical scale for a short-distance object at a travel direction distance that is equal to the distance threshold value (see the solid line in FIG. 5), or may decrease the vertical scale as the travel direction distance increases (see the dash-dot line in FIG. 5). However, when the vertical scale for the long-distance object is greater than the vertical scale for the short-distance object at a travel direction distance that is equal to the distance threshold value, the sense of depth is spoiled. Therefore, when displaying the image in the magnification display mode, it is preferable that the display controller 8 sets the vertical scale for the long-distance object to be greater than that of the normal display mode within a range that is equal to or less than the vertical scale for the short-distance object at a travel direction distance that is equal to the distance threshold value.

In addition, when displaying the image in the magnification display mode, the display controller 8 may set the horizontal scale to be equal to that of the normal display mode, and may make minute adjustments so that the positional relationship relative to the background image Ib does not become unnatural.

When the image is displayed in the magnification display mode, the gap between the two object icon images I1 and I2 becomes larger than when the image is displayed in the normal display mode. When displaying a plurality of object icon images I1 and I2 in the magnification display mode, the display controller 8 may display object information associated with each object in the vicinity of each object icon image I1 and I2, as illustrated in FIG. 4, using the space formed between the object icon images I1 and I2. FIG. 4 illustrates a case in which a movement direction of the second object 94 about to enter the roadway from the sidewalk is displayed by an arrow 99 as the object-related information.

In the present embodiment, a case is described in which the display controller 8 sets the form of the background image Ib and the sizes of the icon images Iv, I1, and I2 on the display screen 51 to be the same in the normal display mode and in the magnification display mode, but the present invention is not so limited. The form of the background image and the sizes of the icon images may differ between the normal display mode and the magnification display mode, within a range that does not spoil the sense of depth.

Figure 6:
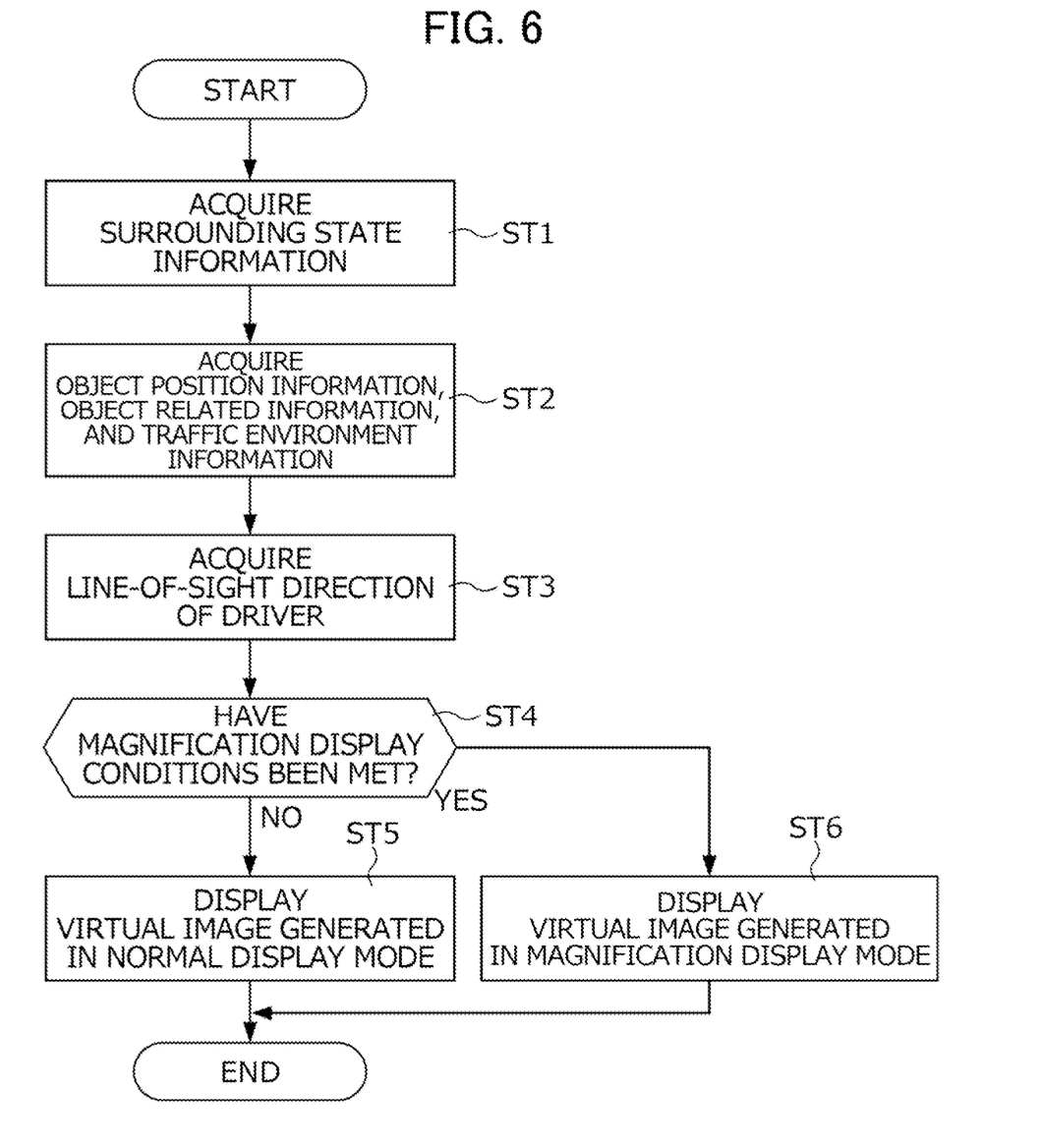
FIG. 6 is a flowchart illustrating a process of the display controller displaying a virtual image.

FIG. 6 is a flowchart illustrating a process of displaying a virtual image on the display screen 51 in the virtual image display device 1.

First, at Step ST1, the surrounding state recognizer 6 acquires surrounding state information from the external sensor unit 2 and the navigation device 3, and advances to Step ST2.

Next, at Step ST2, the surrounding state recognizer 6 acquires object position information, object-related information, and traffic environment information on the basis of the surrounding state information acquired at Step ST1, and advances to Step ST3.

Next, at Step ST3, the line-of-sight direction acquirer 7 acquires a line-of-sight direction of the driver on the basis of an image transmitted from the interior camera unit 4, and advances to Step ST4.

Next, at Step ST4, the display controller 8 determines, on the basis of the surrounding state information acquired at Step ST1 and the line-of-sight direction information acquired at Step ST3, whether or not one of or a combination of six magnification display conditions (A) to (F), defined for setting the display mode of the virtual image to the magnification display mode, have been met. When the determined result of Step ST4 is NO, the display controller 8 advances to Step ST5, displays a virtual image generated in the normal display mode on the display screen 51, and returns to Step ST1. When the determined result of Step ST4 is YES, the display controller 8 advances to Step ST6, displays a virtual image generated in the magnification display mode on the display screen 51, and returns to Step ST1. As described above, the display controller 8 switches between displaying the image in the normal display mode and displaying the image in the magnification display mode on the basis of the surrounding state information.

Magnification display condition (A): On the basis of the surrounding state information, a predetermined number of objects or more are recognized within a predetermined duration of time. Magnification display condition (B): On the basis of the surrounding state information, the presence of a region in which the density of objects is equal to or more than a predetermined value is recognized. Magnification display condition (C): On the basis of the surrounding state information, the presence of a specific facility (for example, a station, commercial facility, or the like where many people or moving bodies enter and exit) or specific equipment (for example, a pedestrian crossing where many people move, a traffic signal, or the like) is recognized in the travel direction from the point of view. Magnification display condition (D): On the basis of the surrounding state information, the presence of a road having a specific form (for example, a crossing, a merging point of two roads, or the like) is recognized in the travel direction from the point of view. Magnification display condition (E): The presence of an object in a line-of-sight direction of the driver is recognized while driving. Magnification display condition (F): When a first object and a second object are recognized in the orientation direction from the point of view, and a gap in the travel direction between the first object and the second object is equal to or smaller than a predetermined gap threshold value.

The virtual image display device 1 according to the present embodiment exhibits the following effects.

(1) The surrounding state recognizer 6 recognizes a traffic participant that is present in the travel direction from the point of view as an object, and acquires object position information including information about the distance from the point of view to the object in the travel direction and the distance from the point of view to the object. The display controller 8 displays a virtual image on the display screen 51 in a manner that provides the viewer with a sense of depth, by displaying an object icon image at a display position in the display screen 51 determined on the basis of the object position information. In addition, the display controller 8 is capable of switching between displaying the image in a normal display mode (that is, displaying the image based on the laws of perspective), in which the display position of the object icon image moves farther away in the screen lateral direction from the lateral reference line L1 in the display screen 51 as the lateral direction distance increases, moves closer in the screen lateral direction to the lateral reference line L1 as the travel direction distance increases, and moves farther away in the screen vertical direction from the screen bottom line L2 of the display screen 51 as the travel direction distance increases, and displaying the image in a magnification display mode, in which the vertical scale, which is the ratio of the distance on the display screen 51 between the screen bottom line L2 and the display position in the screen vertical direction to the travel direction distance, is larger than in the normal display mode. In the magnification display mode, the vertical scale is set to be larger than in the normal display mode, such that when, for example, two objects are present far away, the object icon images of these two objects are displayed more separate in the screen vertical direction in the display screen 51 than in the normal display mode. Thus, according to the virtual image display device 1, the sense of distance between objects that are present far away can easily be ascertained by a user, by displaying the image in the magnification display mode described above.

(2) By making the vertical scale larger as described above, it is easy for the driver to ascertain the sense of distance of objects that are present far away, but it is difficult to ascertain the sense of distance of objects that are present at positions near the point of view. To address this, the virtual image display device 1 sets the vertical scale for short-distance objects at a travel direction distance that is equal to or less than the distance threshold value to be equal in the normal display mode and in the magnification display mode, whereby the driver can easily ascertain the sense of distance of both objects that are present far away from the point of view and objects that are present near the point of view.

(3) The display controller 8 switches between displaying the image in the normal display mode and displaying the image in the magnification display mode on the basis of surrounding state information regarding the state of the surroundings of the point of view. Thus, according to the virtual image display device 1, it is possible to switch between the normal display mode and the magnification display mode at an appropriate timing in response to a change in the state of the surroundings of the point of view.

(4) On the basis of the surrounding state information, the display controller 8 displays the image in the magnification display mode when a predetermined number of objects or more are recognized within a predetermined duration of time, when the presence of a region in which the density of objects is equal to or more than a predetermined value is recognized, when the presence of a specific facility or specific equipment is recognized in the travel direction from the point of view, or when the presence of a road having a specific form is recognized in the travel direction from the point of view. Thus, according to the virtual image display device 1, by displaying the image in the magnification display mode when many objects are already present in the travel direction, or when many objects are expected to appear in the travel direction, it is easy for the driver to ascertain the distance between the plurality of such objects.

(5) The line-of-sight direction acquirer 7 acquires a line-of-sight direction, which is the orientation of the line of sight or the face of the driver, and the display controller 8 displays the image in the magnification display mode when an object is present in the line-of-sight direction, that is to say, when the driver is looking at an object. This makes it easy for the driver to ascertain the sense of distance of an object he or she is looking at.

(6) The display controller 8 displays the image in the magnification display mode when a first object and a second object are recognized in the travel direction from the point of view, and a gap in the travel direction between the first object and the second object is equal to or smaller than a gap threshold value. Thus, when two object icon images would overlap in the normal display mode, displaying the image in the magnification display mode ensures that the two object icon images will not overlap.

(7) When displaying a plurality of object icon images on the display screen 51 in the magnification display mode, the display controller 8 may display many items of information on the display screen 51 without giving the viewer a sense of clutter, by displaying object-related information associated with each object in the vicinity of each object icon image.

(8) The object-related information includes at least one of position information, movement direction information, movement speed information, or type information of the object. Thus, according to the virtual image display device 1, it is possible to quickly recognize information that would be difficult to ascertain from only the object icon image, such as the position, the movement direction, the movement speed, and the type of the object.

An embodiment of the present invention has been described above, but the present invention is not so limited. The detailed configuration may be modified as appropriate within the scope of the present invention.

What is claimed is:

1. A virtual image display device configured to recognize a traffic participant as an object, the traffic participant being present in an orientation direction from a point of view determined based on a user, who is a person, or a mobile body that moves together with the user, and to display an object image associated with the object on a display screen that is visible to the user, in a manner such that a sense of depth is provided, the virtual image display device comprising:

a surrounding state recognizer configured to acquire surrounding state information relating to a state of the surroundings of the point of view, and to acquire, on the basis of the surrounding state information, object position information including information about a distance from the point of view to the object in the orientation direction and a distance from the point of view to the object in a lateral direction that is orthogonal to the orientation direction; and a display controller configured to display the object image at a display position in the display screen, the display position being determined on the basis of the object position information, wherein the display controller is capable of switching between displaying an image in a normal display mode, in which the display position moves farther away in the lateral direction from a lateral reference in the display screen as the lateral direction distance increases, moves closer in the lateral direction to the lateral reference as the orientation direction distance increases, and moves farther away in a vertical direction from a bottom of the display screen as the orientation direction distance increases, and displaying the image in a magnification display mode, in which a vertical scale, which is the ratio of the distance between the bottom and the display position in the vertical direction to the orientation direction distance, is larger than in the normal display mode.

2. The virtual image display device according to claim 1, wherein the vertical scale for a short-distance object at an orientation direction distance that is equal to or less than a distance threshold value is equal in the normal display mode and in the magnification display mode.

3. The virtual image display device according to claim 1, wherein the display controller switches between displaying the image in the normal display mode and displaying the image in the magnification display mode, on the basis of the surrounding state information.

4. The virtual image display device according to claim 3, wherein on the basis of the surrounding state information, the display controller displays the image in the magnification display mode when a predetermined number of objects or more are recognized within a predetermined duration of time, when the presence of a region in which the density of objects is equal to or more than a predetermined value is recognized, when the presence of a specific facility or specific equipment is recognized in the orientation direction from the point of view, or when the presence of a road having a specific form is recognized in the orientation direction from the point of view.

5. The virtual image display device according to claim 2, wherein the display controller switches between displaying the image in the normal display mode and displaying the image in the magnification display mode, on the basis of the surrounding state information.

6. The virtual image display device according to claim 5, wherein on the basis of the surrounding state information, the display controller displays the image in the magnification display mode when a predetermined number of objects or more are recognized within a predetermined duration of time, when the presence of a region in which the density of objects is equal to or more than a predetermined value is recognized, when the presence of a specific facility or specific equipment is recognized in the orientation direction from the point of view, or when the presence of a road having a specific form is recognized in the orientation direction from the point of view.

7. The virtual image display device according to claim 1, further comprising a line-of-sight direction acquirer configured to acquire a line-of-sight direction, which is the orientation of the line of sight or the face of the user, who is the driver of the mobile body,
wherein the display controller displays the image in the magnification display mode when an object is present in the line-of-sight direction.

8. The virtual image display device according to claim 2, further comprising a line-of-sight direction acquirer configured to acquire a line-of-sight direction, which is the orientation of the line of sight or the face of the user, who is the driver of the mobile body,
wherein the display controller displays the image in the magnification display mode when an object is present in the line-of-sight direction.

9. The virtual image display device according to claim 1, wherein the display controller displays the image in the magnification display mode when a first object and a second object are recognized in the orientation direction from the point of view, and a gap in the orientation direction between the first object and the second object is equal to or smaller than a gap threshold value.

10. The virtual image display device 1 according to claim 2, wherein the display controller displays the image in the magnification display mode when a first object and a second object are recognized in the orientation direction from the point of view, and a gap in the orientation direction between the first object and the second object is equal to or smaller than a gap threshold value.

11. The virtual image display device according to claim 1, wherein when displaying a plurality of the object images on the display screen in the magnification display mode, the display controller displays object-related information associated with each object in a vicinity of each object image.

12. The virtual image display device according to claim 11, wherein the object-related information includes at least one of position information, movement direction information, movement speed information, or type information of the object.

13. The virtual image display device according to claim 2, wherein when displaying a plurality of the object images on the display screen in the magnification display mode, the display controller displays object-related information associated with each object in a vicinity of each object image.

14. The virtual image display device according to claim 13, wherein the object-related information includes at least one of position information, movement direction information, movement speed information, or type information of the object.

* * * * *